United States Patent
Krugly

(10) Patent No.: US 6,304,463 B1
(45) Date of Patent: Oct. 16, 2001

(54) SINGLE-ENDED FORWARD CONVERTER CIRCUIT WITH QUASI-OPTIMAL RESETTING FOR SYNCHRONOUS RECTIFICATION

(75) Inventor: Simon Krugly, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/546,592

(22) Filed: Apr. 11, 2000

Related U.S. Application Data

(60) Provisional application No. 60/133,077, filed on May 7, 1999.

(51) Int. Cl.[7] .............................. H02M 3/335; H02M 3/24; H02M 5/42

(52) U.S. Cl. ................................ 363/21.06; 363/21.04; 363/97

(58) Field of Search .......................... 363/16, 20, 95, 363/97, 131, 21.06, 21.04, 21.09

(56) References Cited

U.S. PATENT DOCUMENTS

| Re. 36,571 | * | 2/2000 | Rozman | 363/21 |
|---|---|---|---|---|
| 4,441,146 | | 4/1984 | Vinciarelli | 363/20 |
| 4,688,160 | | 8/1987 | Fraidlin | 363/21 |
| 4,975,821 | | 12/1990 | Lethellier | 363/21 |
| 5,126,931 | | 6/1992 | Jitaru | 363/21 |
| 5,353,212 | | 10/1994 | Loftus, Jr. | 363/17 |
| 5,434,768 | | 7/1995 | Jitaru et al. | 363/21 |
| 5,521,807 | * | 5/1996 | Chen et al. | 363/21 |
| 5,528,482 | * | 6/1996 | Rozman | 363/21 |
| 5,625,541 | | 4/1997 | Rozman | 363/21 |
| 5,708,571 | * | 1/1998 | Shinada | 363/16 |
| 5,764,047 | * | 6/1998 | Massie | 324/117 R |
| 5,781,420 | * | 7/1998 | Xia et al. | 363/21 |
| 5,872,705 | * | 2/1999 | Loftus, Jr. | 363/21 |
| 5,886,881 | | 3/1999 | Xia et al. | 363/21 |

OTHER PUBLICATIONS

"Design Techniques For Transformer Active Reset Circuits At High Frequencies And Power Levels" By Bruce Carsten, Oltronics Canada Ltd.; HFPC'90 , Santa Clara CA; pp. 1–12, No month 1990.

"A Hybrid Series—Parallel Resonant Converter For High Frequencies And Power Levels" By Bruce Carsten, Oltronics Canada Ltd.; PC&IM Magazine, Mar, 1986; pp. 1–7.

"High Power SMPS Require Intrinsic Reliability" By Bruce Carsten, Telecom Power Corporation: Official Proceedings of the Third International PCI'81 Conference, Sep. 14–17, Munich, West Germany PCT'81 Proceedings; pp. 118–133, Sep. 1981.

(List continued on next page.)

*Primary Examiner*—Peter S. Wong
*Assistant Examiner*—Bao Q. Vu
(74) *Attorney, Agent, or Firm*—O'Melveny & Myers LLP

(57) ABSTRACT

A single-ended DC-to-DC converter includes a power transformer having a primary winding and a secondary winding, with a primary switch and an input voltage source coupled in series with the primary winding of the transformer. The primary switch is periodically made active upon application of a control input to permit current flow through the primary winding. The primary switch further has a parasitic capacitance. In a first embodiment of the invention, a reset circuit is provided including an auxiliary switch, an auxiliary voltage source coupled to the auxiliary switch, and a diode coupled between the auxiliary switch and the secondary winding of the transformer. The auxiliary switch is made active when the primary switch is inactive. During off periods of the primary switch, the transformer is reset in part by resonating magnetizing energy from the transformer to the parasitic capacitance and in part by clamping the secondary winding of the transformer to the auxiliary voltage source through the auxiliary switch and the diode. The single-ended converter further comprises at least one synchronous rectification device having a control terminal responsive a voltage present on the secondary winding to thereby conduct a load current.

21 Claims, 3 Drawing Sheets

OTHER PUBLICATIONS

"Design Tricks, Techniques And Tribulations At High Conversion Frequencies" By Bruce Carsten, Oltronics Canada Ltd. For Eldec Corp.; pp. 1–21, No date listed.

"Push–Pull Switching Generator Without Switching Loss" By Dr. David C. Hamill, Dept. of Electronic & Electrical Engineering, University of Surrey, Guildford, IK; Poluprovodnikovye Pribory v Tekhnike Elektrosvyazi; No. 15, 1975; pp. 95–107, No month.

"Radio Frequency Power Conversion: Rad or the Future" By Bruce Carsten, Oltronics Canada Ltd.; PCIM; Jan. 1986; pp. 34–36.

"Reverse Recovery Characteristics of High Speed Rectifiers" No. 2—High Frequency Power Conversion Series: PCIM; Feb. 1986; pp. 42, 44, 46–48.

"Fast, Accurate Measurement of Core Loss at High Frequencies" No. 3—High Frequency Power Cconversion Series: PCIM; Mar. 1986; pp. 29–30, 32–33.

"Current Mode Control for High Frequency Switchmode" No. 4—High Frequency Power Conversion Series: PCIM; Apr. 1986; pp. 61–64.

"Switchmode Design Techniques Above 500 kHz" By Bruce Carsten, Oltronics, Canada Ltd.; High Frequency Power Conversion, 1986 Tutorial; Session 1, Virginia Beach, Virginia; pp. 1–14, No month.

* cited by examiner

SINGLE-ENDED FORWARD CONVERTER CIRCUIT WITH QUASI-OPTIMAL RESETTING FOR SYNCHRONOUS RECTIFICATION

CROSS-REFERENCE TO RELATED APPLICATION

This application claims the benefit pursuant to 35 U.S.C. § 119(e) of U.S. Provisional Application Number 60/133,077, filed May 7, 1999, which application is specifically incorporated by reference herein in its entirety.

BACKGROUND OF THE INVENTION

1. Field of the Invention

The present invention relates to DC-to-DC power converter circuits, and more particularly, to a single-ended forward DC-to-DC converter having synchronous rectification and a circuit for resetting the transformer core.

2. Description of Related Art

Advancements in the electronic arts have resulted in increased integration of electronic devices onto reduced circuit form factors. This trend has driven a demand for power supplies that provide relatively low supply voltages, such as less than 3.3 volts. Such low voltage power supplies tend to have lower efficiency than higher voltage supplies due in part to the voltage drops across the semiconductor devices of the power supplies.

DC-to-DC converters are a type of low voltage power supply that converts an input DC voltage to a different output DC voltage. Such converters typically comprise a transformer that is electrically coupled via a switching circuit between a voltage source and a load. Converters known as single-ended forward converters include a single switch connected between the voltage source and the primary winding of the transformer to provide forward power transfer to the secondary winding of the transformer when the switch is on and conducting. A MOSFET device is typically used for the switch. It is also known in the art to utilize self-driven synchronous rectification in to provide relatively high efficiency of a DC-to-DC converter. Self-driven synchronous rectification refers to the use of MOSFET rectifying devices (i.e., rectifiers) having control terminals driven by the output voltages of the transformer secondary or auxiliary winding in order to provide the rectification of the output of the transformer.

A limitation of single-ended forward converters is that it is necessary to reset the transformer core to prevent saturation which means to discharge the magnetizing current of the transformer during the off period of the switch. This limitation results from the unipolar character of the transformer core excitation. More particularly, in the case of so-called "resonant reset" forward converters, when the switch turns off, energy stored in the magnetizing and leakage inductances of the transformer tends to resonate between the inductances of the transformer and the output capacitance of the switch, which generates voltage spikes and high-frequency ringing. Note that a MOSFET has an internal body capacitor ($C_M$) between its drain and source terminals, and an internal body diode ($D_M$) from its source to drain terminal. It is known to add an external capacitance across the switch to decrease the characteristic impedance of the device and the resonant frequency. This results in a reduction of the spikes and the ringing by significantly reducing the resonant frequency; however, the introduction of the additional capacitance disadvantageously increases the turn-on energy losses of the switch since the capacitor energies are dissipated when the main switch turns on. As a result, the efficiency of the converter is degraded.

Other known techniques exist for resetting the transformer of a single-ended forward converter while avoiding resonance with the switch capacitance. One such technique is to include an auxiliary winding of the transformer having inverted polarity and including a diode connected to the auxiliary winding in series. During the off period of the switch, the voltage across the switch goes to twice the voltage source as the diode becomes forward biased and conducts the magnetizing current back to the voltage source. This transformer resetting technique is referred to as "non-dissipative" since the magnetizing energy of the transformer is effectively recycled. Nevertheless, this technique also has an inherent limitation in that the maximum duty cycle of the converter is limited to 50% when a one-to-one primary to auxiliary turn ratio is used.

Another known transformer resetting technique is to include a resistor-capacitor-diode (RCD) network in parallel with the primary winding. The RCD network clamps the voltage on the switch to the minimal peak voltage consistent with a given source voltage and switch duty cycle, thereby eliminating the need for dead time while allowing for a wide range of duty cycles. This tends to reduce the voltage stress applied to the switch. Moreover, the transformer construction is simplified by avoiding the use of an auxiliary transformer winding. Nevertheless, this transformer resetting technique reduces the efficiency of the converter due to the dissipation of the magnetizing energy accumulated in the transformer during the on period of the switch. Instead of being recycled, this magnetizing energy is partially converted into heat by the RCD network.

An additional drawback of these non-dissipative and partly-dissipative transformer reset techniques is that there is a dead time while the primary switch remains open. During this dead time, the voltage across the switch equals the source voltage, so the voltage across the transformer equals zero and the magnetizing current either is equal to zero or is circulating in the opposite direction. The dead time increases undesirable voltage stress on the switch. Moreover, these transformer reset: techniques are also incompatible with the use of self-driven synchronous rectification, since the driving voltage of the free-wheeling rectifier is equal to zero during the dead time. This results in inefficiency of the converter, since inductor current is conducted through the body diode of the free-wheeling rectifier during the dead time.

Yet another method of transformer resetting is to use a series connection of a capacitor and an auxiliary switch connected across the transformer winding either on the primary or on the secondary side (referred to as an "active clamp"). When the main switch is turned off, the auxiliary switch is turned on, and vice versa. Thereby, magnetizing energy in the transformer is transferred to the clamping capacitor, and the clamping capacitor is resonating with the magnetizing inductance maintaining the necessary level of reset voltage. This active clamp reset provides non-dissipative reset of the transformer and minimal voltage stress on the main switch under steady state conditions as dead time is almost zero. For this reason, the active clamp method is compatible with self-driven synchronous rectification. Nevertheless, the driving voltage of the free-wheeling rectifier is highly variable (in reverse proportion to the line voltage), which may cause excessive gate losses of the free-wheeling rectifier at high switching frequencies, too low driving voltages in case of low output voltage at high line, or too high driving voltage at low line. Moreover, the active clamp method has other drawbacks, particularly under transient conditions (i.e., transitioning the line voltage from low to high or from high to low). Specifically, when the converter transitions from a low line voltage to a high line voltage, the main switch can be exposed to high voltage stress. Conversely, when the converter transitions from high line voltage to low line voltage, the transformer can be saturated as it takes time for the clamping capacitor to change its voltage.

Thus, it would be very desirable to provide a single-ended forward converter having a transformer resetting circuit that overcomes these and other drawbacks of the prior art, and which would be compatible with self-driven synchronous rectification. It would be further desirable to provide a single-ended forward converter able to accommodate transitions between high and low line voltage conditions.

SUMMARY OF THE INVENTION

In accordance with the teachings of the present invention, a single-ended forward voltage converter is provided having "quasi-optimal" resetting that utilizes both a resonant transformer reset process and clamping to a constant voltage. The voltage converter thereby provides reduced voltage stress on the MOSFET power switch while providing constant amplitude voltages for self-driven synchronous rectification and accommodating transitions between high and low line voltages.

More particularly, a single-ended DC-to-DC converter includes a power transformer having a primary winding and a secondary winding, with a primary switch and an input voltage source coupled in series with the primary winding of the transformer. The primary switch is periodically made active upon application of a control input to permit current flow through the primary winding. The primary switch further has a parasitic capacitance. In a first embodiment of the invention, a reset circuit is provided including an auxiliary switch, an auxiliary voltage source coupled to the auxiliary switch, and a diode coupled between the auxiliary switch and the secondary winding of the transformer. The auxiliary switch is made active when the primary switch is inactive. During off periods of the primary switch, the transformer is reset in part by resonating magnetizing and leakage energy from the transformer to the parasitic capacitance and in part by clamping the secondary winding of the transformer to the auxiliary voltage source through the auxiliary switch and the diode. The single-ended converter further comprises at least one synchronous rectification device having a control terminal responsive to a voltage present on the diode to thereby conduct a load current.

In an embodiment of the invention, the auxiliary switch comprises a control terminal coupled to an end of the secondary winding. The auxiliary switch further comprises a p-channel MOSFET device that is made active upon a zero voltage being present at the end of said secondary winding. In another embodiment of the invention, the transformer further comprises an auxiliary control winding, and the control terminal of the auxiliary switch is coupled to an end of the auxiliary control winding. The auxiliary switch may further comprise a p-channel MOSFET device that is made active upon a negative voltage being present at the end of said auxiliary winding, or an n-channel MOSFET device that is made active upon a positive voltage being present at the end of the auxiliary winding.

A more complete understanding of the single-ended forward converter circuit with quasi-optimal resetting for synchronous rectification will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a transformer resetting method for a single-ended forward converter that overcomes the drawbacks of the prior art and is compatible with self-driven synchronous rectification. In the detailed description that: follows, it should be appreciated that like element numerals are used to describe like elements illustrated in one or more of the aforementioned figures.

Figure 1:
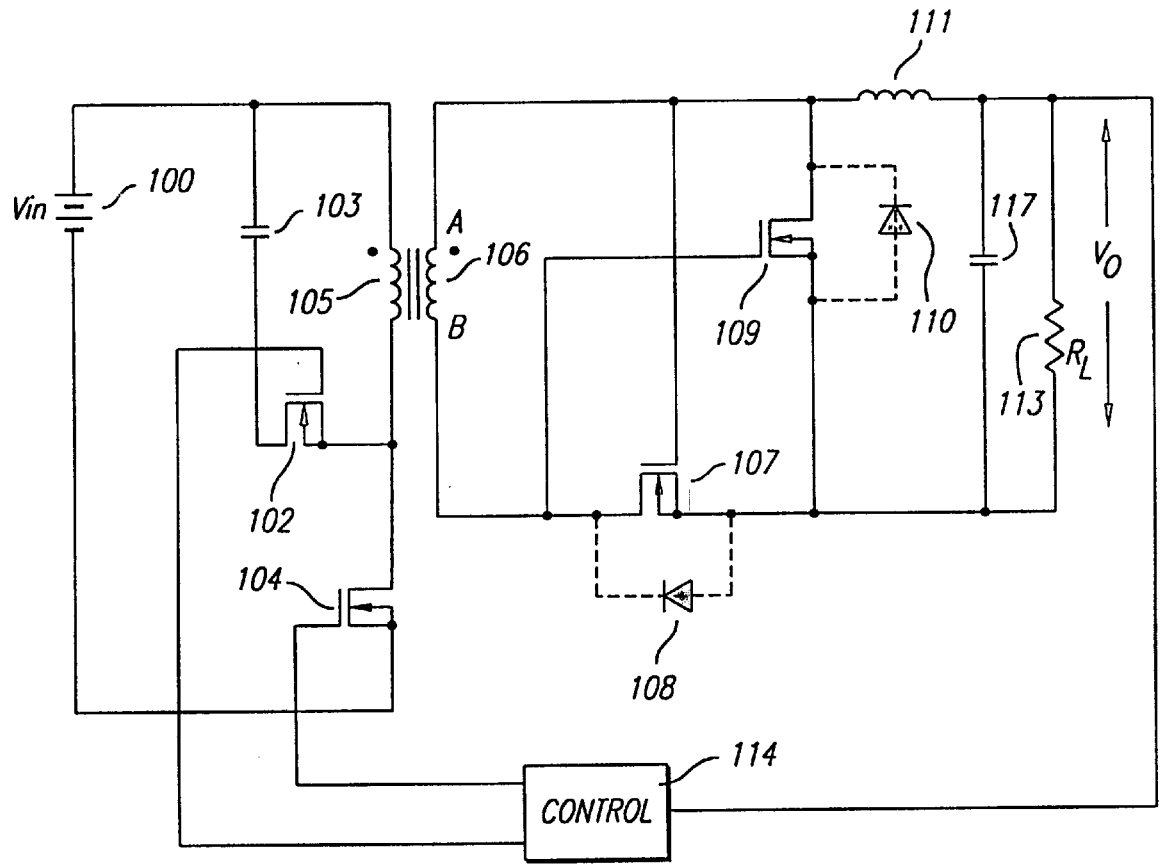
FIG. 1 is a schematic drawing of an active clamped forward converter circuit with a self-driven synchronous rectifier as known in the prior art.

Referring first to FIG. 1, a prior art single-ended forward converter is illustrated. As will be further described below, the prior art single-ended forward converter includes an active clamp and synchronous rectification. More particularly, a DC voltage input $V_{in}$ 100 is connected to the primary winding 105 of a power transformer by an n-channel MOSFET power switch 104. The power switch 104 is shunted by a series connection of a clamp capacitor 103 and an auxiliary n-channel MOSFET switch 102. The gates of the MOSFET power switch 104 and the auxiliary MOSFET switch 102 are driven by a control device 114 in such a way that their conductive intervals are mutually exclusive. The secondary winding 106 of the transformer is connected to a load ($R_L$) 113 through an output filter inductor 111 and a self-driven synchronous rectification circuit. An output voltage ($V_o$) may be derived across the load 113 coupled between the output terminal and ground. A capacitor 117 is coupled between the output terminal and ground to filter high frequency components of the rectified output voltage.

The sychrounous rectificationcircuit further includes first and second rectifiers 107, 109 that are each provided by n-channel MOSFET devices. The first rectifier 107 has a drain terminal connected to a first end A of the secondary winding 106 and the second rectifier 109 has a drain terminal connected to a second end B of the secondary winding. The gate terminal of the first rectifier 107 is connected to the second end B of the secondary winding 106, and the gate terminal of the second rectifier 109 is connected to the first end A of the secondary winding. The source terminals of the first and second rectifiers 107, 109 are each coupled to ground. As shown in FIG. 1, the first and second rectifiers 107, 109 each include a respective body diode 108, 110 between drain and source terminals thereof.

With the MOSFET power switch 104 conducting, the input voltage is applied across the primary winding 105. The input voltage induces a current in the secondary winding 106, thereby defining a voltage at end A of the secondary winding that turns on the first rectifier 107. The polarity of the secondary winding 106 defines the current flow on the secondary side through the inductor 111, the load 113 and back through the first rectifier 107 to the secondary winding 106. When the power switch 104 is non-conducting, the voltage across the MOSFET power switch 104 is clamped through the conducting auxiliary MOSFET switch 102 to the voltage across the capacitor 103. On the secondary side, the voltage across the secondary winding 106 reverses polarity and thereby turns on the second rectifier 109 while turning off the first rectifier 107. Current remaining in the inductor 111 flows through the load 113 and the MOSFET rectifier 109. The output filter capacitor 117 shunts the output of the converter.

Figure 2:
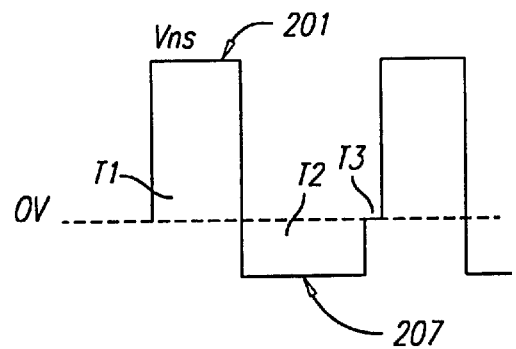
FIG. 2 is a graph illustrating voltage waveforms of a power conduction cycle of the prior art converter of FIG. 1.

The MOSFET rectifiers 107, 109 are controlled in synchronism with the voltage appearing across the secondary winding 106, thereby providing synchronous rectification. This voltage across the secondary winding 106 is shown graphically by the voltage waveform 201 in FIG. 2. During the conduction interval $T_1$ of the power switch 104, the secondary winding voltage $V_{ns}$ drives the gate of the MOSFET rectifier 107 to make it conducting. The MOSFET rectifier 109 is driven to be non-conducting during the $T_1$ interval. The conducting MOSFET rectifier 107 provides the current path allowing energy transfer to the output during the interval $T_1$. As the power MOSFET switch 104 turns off, the voltage $V_{ns}$ across the secondary winding 106 reverses polarity just as the time interval $T_2$ begins. This voltage reversal initiates a reset of the transformer magnetizing inductance, discharges the gate of the MOSFET rectifier 107 and starts charging the gate of the MOSFET rectifier 109. As shown by the voltage waveform of FIG. 2., the voltage across the secondary winding 202 is practically a constant value that collapses to zero in the subsequent time interval $T_3$. The time interval $T_3$ occurs prior to the subsequent conduction interval of the MOSFET switch 104 and is necessary to ensure that cross-conduction of the MOSFET switches 102 and 104 does not occur. During the time interval $T_3$, the body diode 110 of the MOSFET rectifier 109 starts to conduct which reduces the efficiency of the converter at high frequencies where $T_3$ is significant portion of the off time of the MOSFET switch 104. This is aggravated by the fact that the body diode 110 has a large forward voltage drop.

The voltage across the secondary winding 106 driving the gate of MOSFET rectifiers 107, 109 varies with the input voltage $V_{in}$, which causes either insufficient gate voltage at high line and low output voltages, or excessive gate losses at low line and high switching frequencies. Though the driving voltages of the MOSFET rectifiers 107, 109 can be limited by including additional MOSFET devices connected in series with the, gates of the MOSFET rectifiers 107, 109, this solution increases complexity of the converter while still not overcoming the insufficient gate voltages at high line. An active clamp circuit comprising the auxiliary MOSFET switch 102 and the clamping capacitor 103 provides a non-dissipative reset of the transformer and minimizes voltage stress on the main MOSFET switch 104 under steady state conditions. Under transient conditions when line voltage makes a fast transition from low to high voltage, or vice versa, however, the main MOSFET switch 104 can be exposed to high voltage stress or the transformer can be saturated as the clamping capacitor 103 takes time to recharge to a new steady state voltage.

Figure 3:
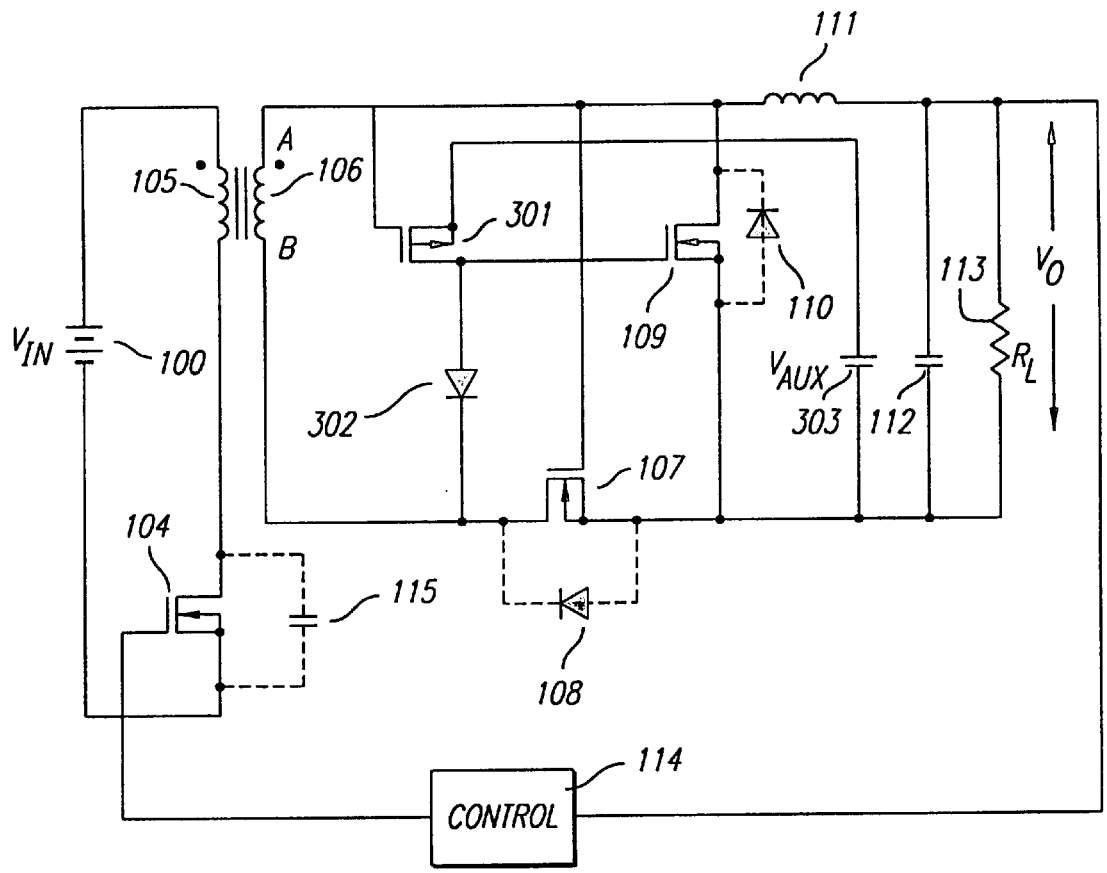
FIG. 3 is a schematic drawing of a single-ended forward converter circuit in accordance with a first embodiment of the invention.

The performance of the single-ended forward converter with synchronous rectification is improved according to an embodiment of the invention shown in the schematic drawing of FIG. 3. As in the prior art circuit, a DC voltage input $V_{in}$ 100 is connected to the primary winding 105 of the power transformer by a MOSFET power switch 104. A control device 114 drives the gate of the MOSFET power switch 104. The secondary winding 106 is connected to a load 113 through an output filter inductor 111 and a synchronous rectification circuit including the MOSFET rectifying devices 107, 109. The rectifying devices 107, 109 include body diodes 108, 110, respectively. A capacitor 112 is coupled between the output terminal and ground to filter high frequency components of the rectified output voltage.

The single-ended forward converter of FIG. 3 further includes an auxiliary MOSFET switch 301, a diode 302, and an auxiliary voltage source ($V_{aux}$) 303. The auxiliary MOSFET switch 301 is a p-channel device. The second end B of the secondary winding 106 is connected to the voltage source 303 through the auxiliary MOSFET switch 301 and the diode 302. The gate terminal of the MOSFET rectifier 109 is connected to an anode of the diode 302 and to the drain terminal of the auxiliary MOSFET switch 301. The source terminal of the auxiliary MOSFET switch 301 is connected to the voltage source 303. The gate terminal of the auxiliary MOSFET switch 301 is connected to the first end A of the secondary winding 106.

With the power switch 104 conducting, the input voltage is applied across the primary winding 105 that impresses a corresponding voltage across the secondary winding 106 that turns on the MOSFET rectifier 107. The polarity of the secondary winding 106 defines the current flow on the secondary side through the inductor 111, the load 113, and back through the MOSFET rectifier 107 to the secondary winding 106 in the same manner as described above. When the power switch 104 is turned off, the magnetizing and leakage inductances of the transformer starts to charge the parasitic capacitance 115 of the MOSFET power switch 104. Then, when the voltage across the MOSFET power switch 104 goes above $V_{in}$, the voltage across the secondary winding 106 reverses its polarity. At that moment, the MOSFET rectifier 107 turns off and the body diode 110 of the MOSFET rectifier 109 starts to conduct. The reversed voltage across the secondary winding 106 turns the auxiliary MOSFET switch 301 on, so the voltage $V_{aux}$ of the auxiliary voltage source 303 is now applied through the conducting switch 301 to the gate of the MOSFET rectifier 109 and to the anode of the diode 302, thereby turning on the MOSFET rectifier 109. The MOSFET rectifier 109 starts to conduct to provide a path for current from the inductor 111.

In the converter of FIG. 3, the transformer is reset using both a resonant process and clamping to a constant voltage. In the initial portion of the off period of the MOSFET power switch 104, the resonant process dominates whereby the leakage and magnetizing energy of the transformer primary winding 105 is transferred into the parasitic capacitance 115. The voltage across the MOSFET power switch 104 initially rises above $V_{in}$, and this voltage is reflected on the secondary winding 106 which appears at the cathode of the diode 302. Meanwhile, the auxiliary voltage source 303 is applied to the anode of the diode 302 as described above. Since the reflected voltage at the cathode of the diode 302 is greater than the auxiliary voltage $V_{axu}$, the diode 302 is reverse biased and does not conduct any current. After initially rising above $V_{in}$, the voltage across the parasitic capacitance 115 begins to drop due to resonance between the parasitic capacitance and inductance of the primary winding 105.

Eventually, the reflected voltage on the secondary winding 106 drops due to the resonant process until the reflected voltage at the cathode of the diode 302 falls below the auxiliary voltage $V_{aux}$. This causes the diode 302 to become forward biased and begin to conduct current to demagnetize the transformer, and the auxiliary voltage $V_{aux}$ is applied through the diode 302 to the secondary winding 106. At this point, the active clamp process begins to dominate over the resonant process. The parasitic capacitance 115 across the MOSFET power switch 104 becomes charged to a level $V_{cap}$, wherein:

$$=V_{cap}=V_{in}+N*V_{aux}$$

N is the turns ratio of the main transformer. The voltage across the primary winding 105 is thereby clamped to the auxiliary voltage $V_{aux}$. Thus, the diode 302 permits both a resonant and an active clamp process to take place in resetting the transformer.

Figure 4A:
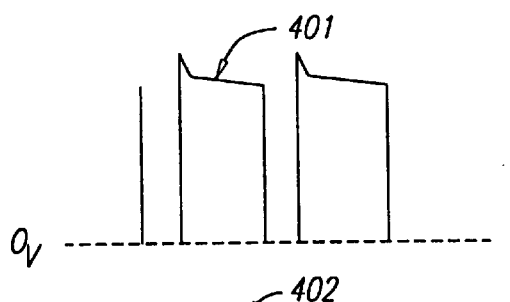
FIGS. 4A and 4B are graphs illustrating voltage waveforms across a parasitic capacitance of a main switch of the single-ended converter of FIG. 3 for high and low line voltage conditions, respectively.
Figure 4B:
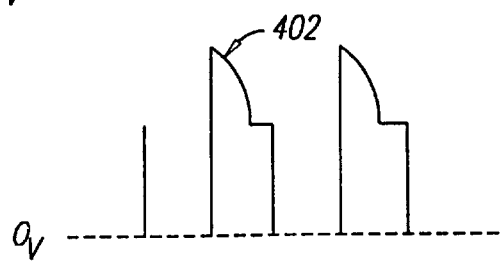

An advantage of the present invention is that the driving voltage of the freewheeling MOSFET rectifier 109 is constant, but reconciles with the demagnetization of the transformer as the point at which the active clamp process dominates over the resonant process is variable depending upon the line voltage level. FIG. 4A illustrates the drain to source voltage across the MOSFET power switch 104 in a high line voltage condition. The waveform 401 has an initial spike portion that corresponds to the leakage and magnetizing energy of the transformer transferring to the parasitic capacitance 115 as part of the resonant process. Following the initial spike, the active clamp process takes over and the voltage levels off to a substantially constant level. As is apparent from FIG. 4A, the transformer is reset mostly by operation of the clamping to a constant voltage in the high line voltage condition. In contrast, FIG. 4B illustrates the drain to source voltage across the MOSFET power switch 104 in a low line voltage condition. The waveform 402 has a much longer resonant portion (characterized by the downward curve) followed by clamping portion of relatively short duration (characterized by the level voltage). As is apparent from FIG. 4B, the transformer is reset mostly by operation of the resonant process in the low line voltage condition. Thus, it should be appreciated that any line voltage between high and low line can be automatically accommodated by shifting of the transition point between the resonant and active clamp processes as determined by the bias condition of the diode 302.

By selecting an appropriate voltage $V_{aux}$ for the auxiliary voltage source 303, it should be appreciated that the voltage stress on the MOSFET power switch 104 is minimized to a theoretically minimum level at high line voltage in steady-state conditions. At low line voltage, the voltage stress on the MOSFET power switch 104 i!3 not minimal, but it nevertheless does not exceed the voltage stress at high line. Since the resetting voltage is constant, the maximum stress on the MOSFET power switch 104 during line transient conditions does not exceed the steady-state value. The voltage at the anode of the auxiliary diode 302 is used to drive the free-wheeling synchronous MOSFET rectifier 109, thereby providing constant driving voltage independent of the line voltage and thus optimizing the performance of the synchronous rectifier.

As described above, the auxiliary MOSFET switch 301 is controlled automatically by the voltage on the secondary winding 106, thereby avoiding the need for a separate gate control device as in the prior art. It should be appreciated that the auxiliary MOSFET switch 301 could alternatively be provided by an n-channel device that is controlled by a separate control device, such as an auxiliary winding of the transformer. Examples of such embodiments of the invention are shown in FIGS. 5 and 6.

Figure 5:
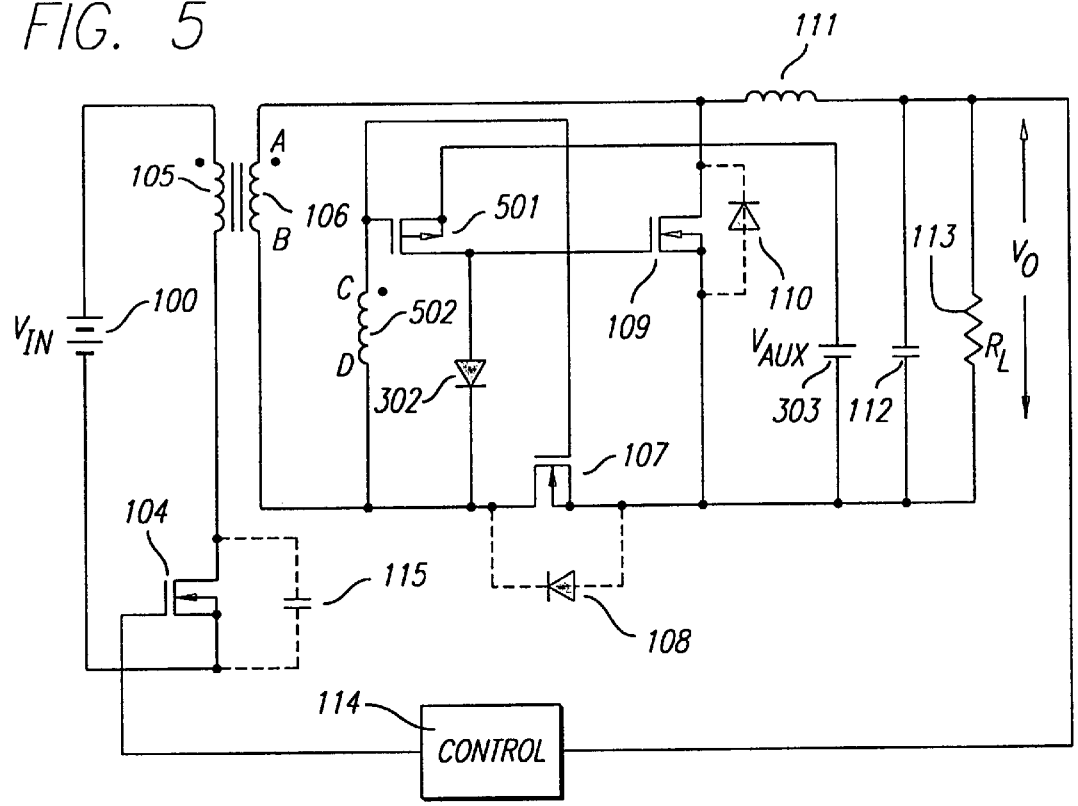
FIG. 5 is a schematic drawing of a single-ended forward converter circuit in accordance with a second embodiment of the invention.

More particularly, FIG. 5 illustrates an alternative embodiment of the invention. In FIG. 5, the transformer includes an auxiliary winding 502 having the same polarity as the primary and secondary windings 105, 106. The gate terminals of the auxiliary MOSFET switch 501 and the MOSFET rectifier 107 are driven by the auxiliary winding 502 (end C shown in FIG. 5). The auxiliary MOSFET switch 501 and the MOSFET rectifier 107 will each be controlled in the same manner as described above with respect to FIG. 3, since the input voltage applied across the primary winding 105 induces voltage in the auxiliary winding 502, thereby defining a voltage at end C of the auxiliary winding that turns on the rectifier 107. When the voltage across the primary winding 105 reverses, the auxiliary MOSFET switch 501 is driven to conduct in the same manner as described above. The use of an auxiliary winding 502 helps to reduce some cross-conduction of the MOSFET switch 501 and the body diode 108 at the beginning of the on time of the power switch 104.

Figure 6:
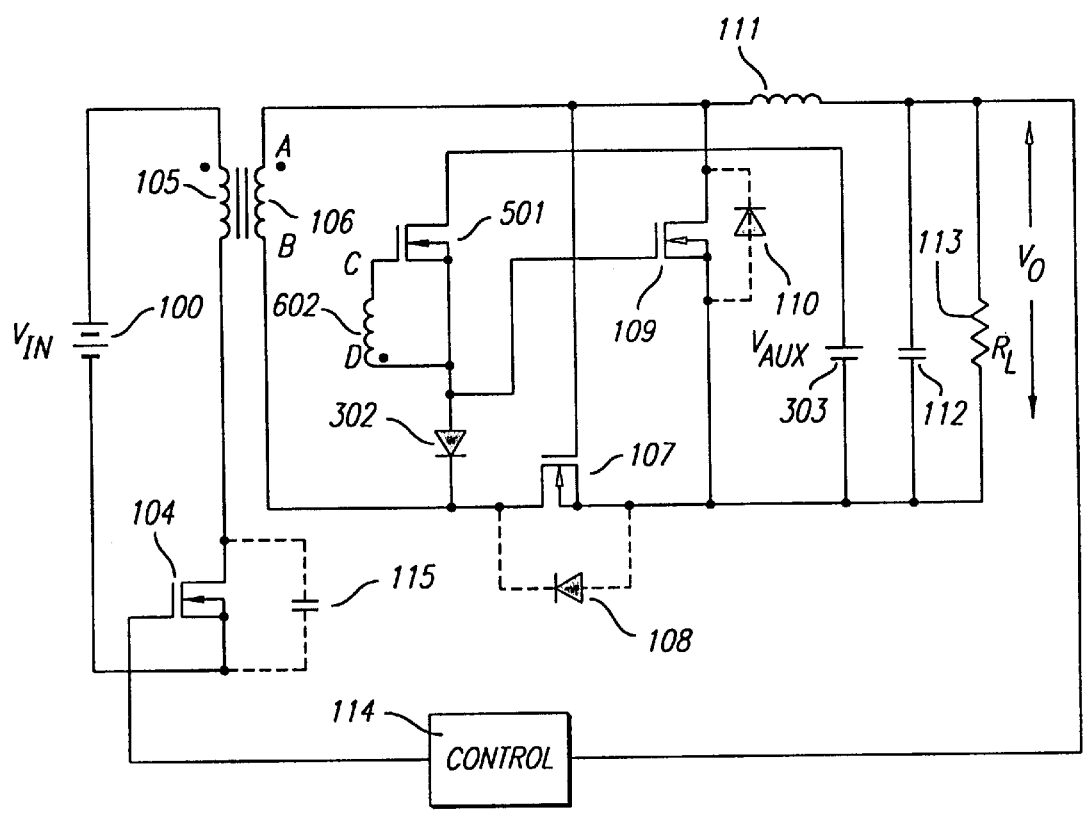
FIG. 6 is a schematic drawing of a single-ended forward converter circuit in accordance with a third embodiment of the invention.

FIG. 6 illustrates another embodiment of the invention, having an auxiliary MOSFET switch 501 provided by an n-channel device rather than the p-channel device used in the embodiments of FIGS. 3 and 5. As in FIG. 5, an auxiliary winding 602 is used for driving the auxiliary MOSFET switch 501. In this embodiment, however, the polarity of the auxiliary winding 602 is reversed with respect to the primary and secondary windings 105, 106. The gate terminal of the auxiliary MOSFET switch 501 is driven by the auxiliary winding 602 (end C shown in FIG. 6). The gate terminal of the MOSFET rectifier 107 is driven by the secondary winding 106 in the same manner as the embodiment of FIG. 3. The auxiliary MOSFET switch 501 otherwise will be triggered in the same manner as described above with respect to FIG. 3. When the voltage across the primary winding 105 reverses, the auxiliary MOSFET switch 501 is driven by the auxiliary winding 602 to conduct, causing the voltage $V_{aux}$ of the auxiliary voltage source 303 to be applied through the conducting switch 501 to the gate of the MOSFET rectifier 109 and to the anode of the diode 302.

Having thus described a preferred embodiment of a single-ended forward converter circuit with quasi-optimal resetting for synchronous rectification, it should be apparent to those skilled in the art that certain advantages of the aforementioned system have been achieved. It should also be appreciated that various modifications, adaptations, and alternative embodiments thereof may be made within the scope and spirit of the present invention. For example, other types of high speed switching devices could be used in place of the MOSFETS described above. The invention is further defined by the following claims.

What is claimed is:

1. A single-ended voltage converter comprising:
   a power transformer having a primary winding and a secondary winding;
   a primary switch and an input voltage source coupled in series with said primary winding of said transformer, said primary switch being periodically made active upon application of a control input to permit current flow through said primary winding, said primary switch further having a parasitic capacitance; and a reset circuit comprising an auxiliary switch, an auxiliary voltage source coupled to said auxiliary switch, and a diode coupled between said auxiliary switch and said secondary winding of said transformer, said auxiliary switch being active when said primary switch is inactive, wherein said transformer is reset upon said primary switch becoming inactive in part by resonating magnetizing and leakage energy from said transformer to said parasitic capacitance and in part by clamping said secondary winding of said transformer to said auxiliary voltage source through said auxiliary switch and said diode.

2. The single-ended converter of claim 1, wherein said auxiliary switch comprises a control terminal coupled to an end of said secondary winding.

3. The single-ended converter of claim 2, wherein said auxiliary switch further comprises a p-channel MOSFET device, said auxiliary switch being thereby made active upon a zero voltage being present at said end of said secondary winding.

4. The single-ended converter of claim 1, wherein said transformer further comprises an auxiliary winding, said auxiliary switch comprising a control terminal coupled to an end of said auxiliary winding.

5. The single-ended converter of claim 4, wherein said auxiliary switch further comprises a p-channel MOSFET device, said auxiliary switch being thereby made active upon a zero voltage being present at said end of said auxiliary winding.

6. The single-ended converter of claim 4, wherein said auxiliary switch further comprises an n-channel MOSFET device, said auxiliary switch being thereby made active upon a positive voltage being present at said end of said auxiliary winding.

7. The single-ended converter of claim 1, further comprising at least one synchronous rectification device having a control terminal responsive to a voltage present on said secondary winding to thereby conduct a load current.

8. The single-ended converter of claim 7, wherein said at least one synchronous rectification device further comprises at least one MOSFET device.

9. A single-ended voltage converter comprising:

a power transformer having a primary winding and a secondary winding;

a primary switch and an input voltage source coupled in series with said primary winding of said transformer, said primary switch being periodically made active upon application of a control input to permit current flow through said primary winding; and means for resetting said transformer during periods when said primary switch is inactive, said resetting means further comprising first means for resonating magnetizing energy from said transformer and second means for clamping said secondary winding of said transformer to an auxiliary voltage, said second means comprising an auxiliary switch, an auxiliary voltage source coupled to said auxiliary switch and providing said auxiliary voltage, and a diode coupled between said auxiliary switch and said secondary winding of said transformer, said auxiliary switch being active when said primary switch is inactive.

10. The single-ended converter of claim 9, wherein said auxiliary switch comprises a control terminal coupled to an end of said secondary winding.

11. The single-ended converter of claim 10, wherein said auxiliary switch further comprises a p-channel MOSFET device, said auxiliary switch being thereby made active upon a zero voltage being present at said end of said secondary winding.

12. The single-ended converter of claim 9, wherein said transformer further comprises an auxiliary winding, said auxiliary switch comprising a control terminal coupled to an end of said auxiliary winding.

13. The single-ended converter of claim 12, wherein said auxiliary switch further comprises a p-channel MOSFET device, said auxiliary switch being thereby made active upon a zero voltage being present at said end of said auxiliary winding.

14. The single-ended converter of claim 12, wherein said auxiliary switch further comprises an n-channel MOSFET device, said auxiliary switch being thereby made active upon a positive voltage being present at said end of said auxiliary winding.

15. The single-ended converter of claim 9, further comprising at least one synchronous rectification device having a control terminal responsive a voltage present on said secondary winding to thereby conduct a load current.

16. The single-ended converter of claim 15, wherein said at least one synchronous rectification device further comprises a MOSFET device.

17. The single-ended converter of claim 9, wherein said first means further comprises a parasitic capacitance of said primary switch.

18. A method of resetting a transformer core in a single-ended DC-DC converter comprising:

transferring energy from a primary winding to a secondary winding of a transformer during an on period of a periodic power conduction cycle;

resonating magnetization energy from said transformer during a first portion of an off period of said periodic power conduction cycle; and clamping said secondary winding to a source of constant voltage during a second portion of said off period of said power conduction cycle, said clamping step including conducting magnetizing current in only one direction away from said constant voltage source.

19. The method of claim 18, wherein said transferring step further comprises periodically activating a switch to couple said primary winding to an input voltage source during said on period.

20. The method of claim 19, wherein said resonating step further comprises resonating magnetization energy from said transformer to a parasitic capacitance of said switch.

21. The method of claim 19, further comprising varying a transition period between said first and second portions of said off period in correspondence with line levels of said input voltage source.

* * * * *